United States Patent [19]

Clark et al.

[11] 4,367,924

[45] Jan. 11, 1983

[54] CHIRAL SMECTIC C OR H LIQUID CRYSTAL ELECTRO-OPTICAL DEVICE

[76] Inventors: Noel A. Clark, 3106 Kittrell Ct., Boulder, Colo. 80303; Sven T. Lagerwall, 30 Snackwagen, Goteborg, Sweden

[21] Appl. No.: 110,451

[22] Filed: Jan. 8, 1980

[51] Int. Cl.$^3$ .................... G02F 1/13; G02F 1/133
[52] U.S. Cl. .................... 350/334; 350/347 R; 350/350 S; 350/352
[58] Field of Search ............ 350/350 S, 351, 334–335, 350/347 E, 391, 348, 347 R, 347 V, 352

[56] References Cited

U.S. PATENT DOCUMENTS 3,851,318  2/1974  Taylor et al.
3,854,793  7/1974  Kahn

FOREIGN PATENT DOCUMENTS 2848581  5/1979  Fed. Rep. of Germany

OTHER PUBLICATIONS

Yoshino et al., "New Electro-Optical Effects in Ferroelectric Liquid Crystals", Japanese Jr. of App. Phys., vol. 18, 1979, Supp. 18-1, pp. 427–433.
Iwasaki et al., "Color Switching in Ferroelectric Smectic Liquid Crystals by Electric Field", Jpn. J. Appl. Phys. 1979, pp. 2323–2324.
Meyer, R. B., "Ferroelectric Liquid Crystals: A Review", Mol. Cryst. Liq. Cryst. 1977, pp. 33–48.
Brunet et al., "Defauts dans les Smectiques C Chiraux", Ann. Phys., vol. 3, 1978, pp. 237–247.
R. B. Meyer et al., "Ferroelectric Liquid Crystals", Le Journal de Physique, vol. 36, Mar. 1975, pp. L–69–L–71.
Martinot-Lagarde, "Observation of Ferroelectrical Monodomains in the Chiral Smectic C Liquid Crystals", Le Journal de Physique Colloq., vol. 37, 1976, pp. C3–129 through C3–132.
Martinot-Legarde, "Direct Electrical Measurement of the Permanent Polarization of a Ferroelectric Chiral Smectic C Liquid Crystal", Le Journal de Physique, vol. 38, Jan. 1977, pp. L–17 through L–19.
Takezoe et al., "Birefringence in the Sm A Phase and the Disappearance of Helicoidal Structure in the Sm C Phase Caused by an Electric Field in DOBAMBC", Japanese Journal of Applied Physics, vol. 17, No. 7, Jul. 1978, pp. 1219–1224.
Brunet et al., "Defauts dans les Smectiques C Chiraux", Ann. Phys., vol. 3, No. 2-3-4, 1978, pp. 237–247.
Meyer, "Liquid Crystals for Magneticians: Ferroelectric Liquid Crystals", IEEE Transactions on Magnetics, vol. MAG-12, No. 6, Nov. 1976, p. 788.
Young et al., "Light-Scattering Study of Two-Dimensional Molecular-Orientation Fluctuations in a Freely Suspended Ferroelectric Liquid-Crystal Film", Physical Review Letters, vol. 40, No. 12, Mar. 1978, pp. 773–776.
Pelzl et al., "Tilt Angle Determination of A Smectic C Phase by Field-Induced Freedericksz Transition and X Ray Investigations", Molecular Crystals and Liquid Crystals, vol. 53, No. 3/4, 1979, pp. 167–179.
Simova et al., "Coherent Light Diffraction in A Smectic C Liquid Crystal", Molecular Crystals and Liquid Crystals, vol. 42, 1977, pp. 295–305.
Ostrovskii et al., "Ferroelectric Properties of Smectic Liquid Crystals", JETP, vol. 25, No. 2, Jan. 20, 1977, pp. 70–72.
P. Keller et al., "Synthese et mesomorphisme de quelques p-alkyl $\alpha$-oxybenzylidene, p'-aminocinnamates de R(−) chloro-2 propyle", Comptes Rendus des Seances de l'Academie des Sciences, vol. 282, serie C, Apr. 5, 1976, pp. 639–641.
Ostrovskii et al., "Linear Electro-Optical Effect in a Ferroelectric Smectic Liquid Crystal", Fiz. Tverd. Tela 21(3) 1979, pp. 917–920.
Yoshino et al., "Electro-Optical Effect of Ferroelectric Smectic Liquid Crystal", Japanese Journal of Applied Physics, vol. 17, No. 3, 1978, pp. 597–598.
Anderson, "Optical Applications of Ferroelectrics", Ferroelectrics, vol. 7, 1974, pp. 55–63.
Anderson, "Ferroelectrics in Optical Memories and Displays: A Critical Appraisal", IEEE Transactions, Sonics and Ultrasonics, SU-19, vol. 3, 1972, pp. 69–79.
Hoffmann et al., "Dielectric Study of Ferroelectric Properties and Chiral Smectic C", Molecular Crystals and Liquid Crystals, vol. 8, 1977.

Primary Examiner—William H. Punter
Attorney, Agent, or Firm—Cushman, Darby & Cushman

[57] ABSTRACT

An electro-optical device including a chiral smectic C or H liquid crystal disposed between flat plates treated to enforce molecular orientation parallel to the plates. The plates are spaced by a distance sufficiently small to ensure unwinding of the helix typical in a bulk of the material to form two stable states of the orientation field. The liquid crystal is switched between two stable states by reversing the polarity of an externally applied electric field to make a bistable light valve or other electro-optical devices.

24 Claims, 2 Drawing Figures

Fig. 1

CHIRAL SMECTIC C OR H LIQUID CRYSTAL ELECTRO-OPTICAL DEVICE

BACKGROUND OF THE INVENTION

Liquid crystals have found use in a variety of electro-optical applications, in particular those requiring compact, energy efficient, voltage-controlled light valves such as watch and calculator displays. These devices are based on dielectric alignment effects in nematic, cholesteric, and smectic phases in which, by virtue of the dielectric anisotropy, the average molecular long axis takes up a preferred orientation in an applied electric field. Since the coupling of an applied electric field by this mechanism is rather weak, the electro-optical response time for these devices is too slow for many potential applications.

Liquid crystal devices (LCD) have a number of unique characteristics including low voltage and low power operation making them perhaps the most promising of the non-emissive electro-optic display candidates. The slow response and insufficient non-linearity in LCD's have been the serious limitations. The lack of speed becomes especially important in proportion to the number of elements that have to be addressed in a device. This leads to increasingly impractical production costs for flat-panel displays with potential use in computer terminals, oscilloscopes, radar and T.V. screens.

Figure 1:
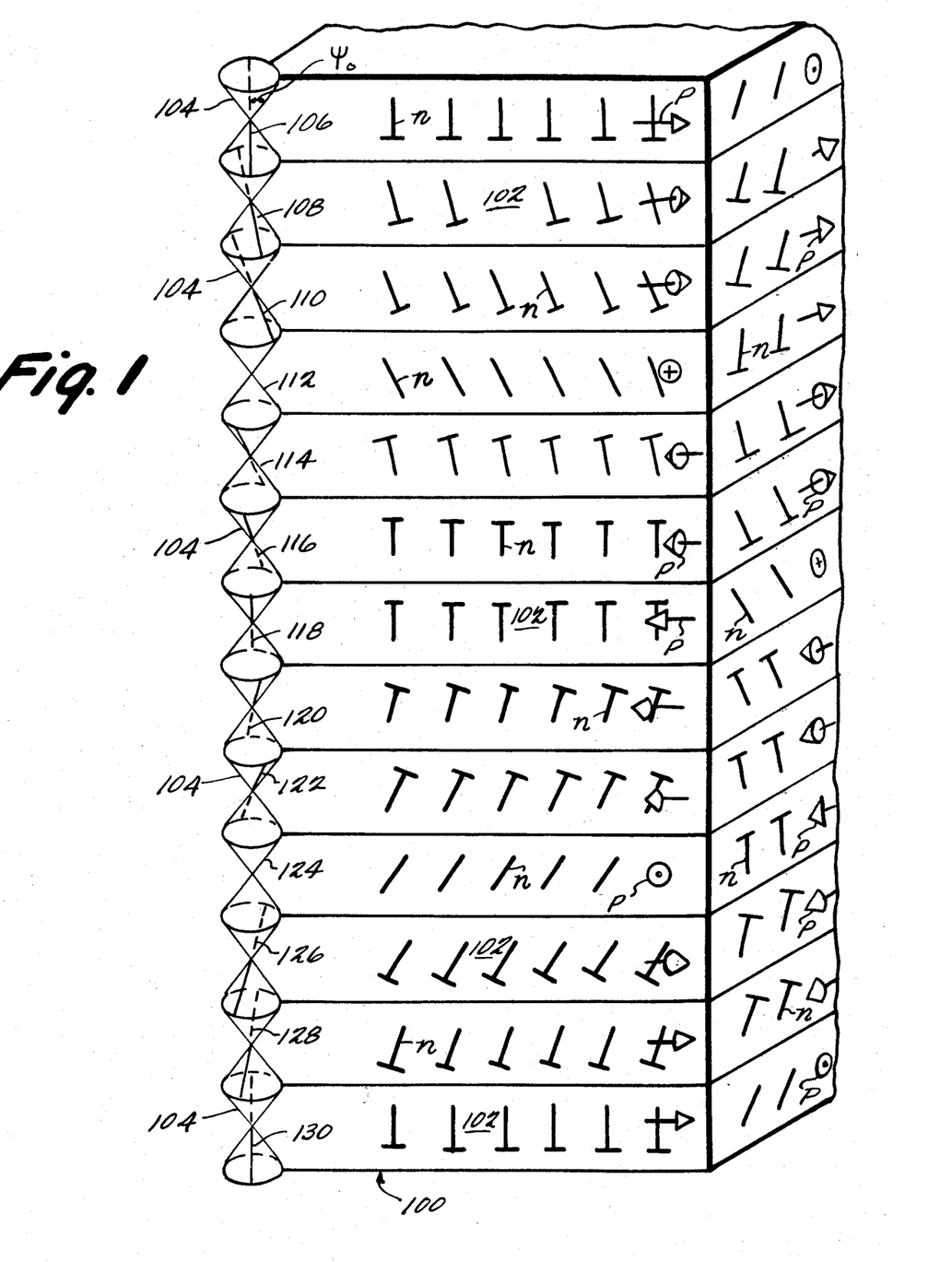
FIG. 1 is a schematic illustration of a chiral smectic C or H liquid crystal in bulk.

FIG. 1 is a schematic of a chiral smectic C or H liquid crystal. Crystal 100 is comprised of layers 102 of molecules. Within each layer 102, the average orientation of the long axes, denoted by the unit vector ñ, is tilted at an angle $\Psi_O$ to the layer normal. Meyer et al, in an article entitled "Ferroelectric Liquid Crystals" in *Le Journal de Physique*, Volume 36 (March, 1975, pp. L-69 to L-71) show that smectic C or H liquid crystals made of optically active molecules (chiral smectic C or H liquid crystals) would, in general, be ferroelectric, possessing an electric dipole density, $\vec{P}$, which is perpendicular to the molecular tilt direction, ñ, and parallel to the smectic layer planes. Their demonstration also applies to the smectic H phase, which is close in structure to the smectic C, but exhibits a higher viscosity against the reorientation of ñ about an axis normal to the layers. The presence of the electric dipole in these chiral smectics provides a much stronger coupling of the molecular orientation to the applied electric field, $\vec{E}$, than is available via the dielectric anisotropy. Furthermore, the coupling is polar in that the preferred orientation of $\vec{P}$ is parallel to $\vec{E}$ so that reversing the polarity of the applied electric field reverses the preferred orientation of $\vec{P}$, meaning that field reversal can be effectively used to control molecular orientation.

Two properties of ferroelectric smectic liquid crystals have impeded the development of convenient methods of exploiting their intrinsic advantages. First, in ferroelectric smectics, the polarization must lie parallel to the layered planes as in FIG. 1 but must be otherwise unconstrained. Consequently, unlike crystalline ferroelectrics, the ferroelectric smectic liquid crystal does not spontaneously form domains of uniform orientation of $\vec{P}$ in the bulk, as this requires preferred orientation directions which, in a crystalline ferroelectric, for example, are provided by the crystal lattice.

Second, as an additional result of the molecule chirality, in a bulk ferroelectric smectic C or H liquid crystal, the unit vector ñ and polarization $\vec{P}$ spiral about the axis normal to the layers from layer to layer through the sample as in FIG. 1. The spiralling cancels the macroscopic dipole moment and corresponds to macroscopic cancelling of polarization by domain formation in crystalline ferroelectrics.

Thus, in FIG. 1, cone 104 for each layer 102 represents the locus of possible orientations of the molecules in a layer. Note that the cone forms an angle $\Psi_O$ with its longitudinal axis. Unit vectors (ñ) 106 through 130 represent the average alignment of the long axes of the molecules in each of the layers. As can be seen, the projection of vector 106 onto the plane represented by the sheet of drawing is a line normal to the plane of layers 102. Moving down through the layers, the average unit vector n of the molecules spiral. Thus, the unit vectors spiral through an azimuthal angle $\phi$, indicated in FIG. 1 of $\phi=90°$ between vector 106 and vector 112. The unit vectors spiral through 180° between vector 112 and vector 124. Finally the unit vectors spiral another 90° between vector 124 and vector 130, so that the total spiral from vector 106 to vector 130 is 360°. Thus, the average unit vector ñ of molecules in the layer associated with unit vector 106 is parallel with the average unit vector ñ of molecules in the layer associated with unit vector 130. The distance between the layer having unit vector 106 and the layer having unit vector 130 is referred to as the pitch of the helix formed by molecules in a direction perpendicular to the layers. In each layer the ferroelectric polarization $\vec{P}$ is normal to ñ and lying in the layer plane.

The distortion and unwinding of the spiral by an applied electric field, similar to that observed in chiral nematics, has been demonstrated. See Meyer et al, op. cit., and Martinot-Legarde, "Observation of Ferroelectrical Monodomains in the Chiral Smectic C Liquid Crystals", *Le Journal de Physique Colloq*, Volume 37 (1976, pp. C3-129 through C3-132), Martinot-Legarde, "Direct Electrical Measurement of the Primitive Polarization of a Ferroelectrics Chiral Smectic C Liquid Crystal", *Le Journal de Physique*, Volume 38 (January, 1977, pp. L-17 through L-19), and Takezoe et al "Birefringence in the Sm A Phase and the Disappearance of Helicoidal Structure in the Sm C Phase Caused by an Electric Field in DOBAMBC", *Japanese Journal of Applied Physics*, Volume 17, No. 7 (July, 1978, pp. 1219-1224). The suppression of the helix in chiral smectic C liquid crystals by boundary conditions which require molecules near the boundary to be parallel to the surface and in a particular direction has also been observed. See Brunet et al "Defauts dans les Smectiques C Chiraux", *Ann. Phys.*, Vol. 3, No. 2-3-4 (1978, pp. 237-247).

Although the advantages of ferroelectric liquid crystals to produce electro-optic effects has been recognized, such effects have not been demonstrated. See Meyer, "Ferroelectric Liquid Crystals; A Review", *Mol. Cryst. Liq. Cryst.*, Volume 40 (1977, pp. 33-48, and especially pp. 36, 38 through 40, 47). On the contrary, although several research groups in different countries have, since 1975, investigated the response of ferroelectric liquid crystals to electric fields, they have not found a significantly faster response than that characteristic of already existing kinds of liquid crystals. It would thus be highly desirable to provide a method whereby the strong coupling of molecular orientation to the applied electric field available in ferroelectric liquid crystals could be effectively utilized to provide a fast, polarity sensitive electro-optical device.

SUMMARY OF THE INVENTION

The present invention is a ferroelectric liquid crystal electro-optical device in which the strong coupling of the molecular orientation to an applied electric field is effectively utilized to provide a fast, polarity sensitive device. In the present invention, chiral smectic C or H liquid crystal material is disposed between flat plates which are treated to enforce molecular orientation parallel to the plates but of unspecified direction in the surface planes. The plates are spaced by a distance sufficiently small to ensure unwinding of the helix. The present inventors have discovered that by employing this structure, the liquid crystal orientation field possesses two stable states. The liquid crystal can be switched between the two states by reversing the polarity of an externally applied electric field, to make a bistable light valve or other electro-optical devices.

If the present invention is employed as a light valve, the boundary plates are of a transparent material and are coated with a semi-transparent electrically conductive layer by which an electric field is applied to the liquid crystal. The orientation of the molecules changes with the reversal of the polarity of the electric field to allow the selection of either of the two stable states. The two states possess optical axes of different orientation, and reorientation of at least one optical axis is employed to alter the intensity of light passing through a polarizer-liquid crystal-polarizer assembly. The resultant electro-optical device has the following attributes: (1) High speed. The electro-optical response is as much as 1,000 to 10,000 times faster (for the smectic C) than currently available electro-optical devices using liquid crystal. (2) Bistability. The electro-optical response is characterized by two stable states, either of which may be selected by an appropriate electric field and either of which is stable in the absence of the field. (3) Threshold behavior. The change from no switching response to full switching response is made over a very small range in the amplitude and duration of the applied field. (4) Large electro-optical response. The optical change induced by the electric field corresponds to a rotation through a 20° to 60° angle of a uniaxial material having a refractive index and anisotropy $\Delta n$ of greater than 0.2. This response is 10 to 100 times larger than that attainable in other bistable electro-optical devices. (5) Built-in gray scale. Due to non-linearities in the switching range, pulse amplitude and pulse width modulation can be used to gain multi-level memory capacity. (6) Color control. The sample birefringence and orientation of the two polarizers can be manipulated to give color effects. Either of two colors in a transmissive or reflective mode of operation could be achieved with a single smectic C sample positioned as described above between two polarizers. With a structure consisting of two smectic C samples between two polarizers, a light valve transmitting or reflecting four colors is achievable.

The present invention may be employed in a variety of applications which are not now possible with the current art. The bistable characteristic of the present invention is advantageous in situations requiring a large number of individual electro-optical devices, such as graphic or pictorial planar displays. The bistability of the device obviates the need for an external electronic or other memory to maintain an image. The present invention may be employed successfully as a matrix-addressed video display. The response of the individual elements is rapid enough to permit the required rate of frame change and its threshold sensitive is such that pulses applied to alter a particular element do not alter others in the same row or column. Also, the optical change associated with the electro-optic effect is large enough to allow for its convenient use. In contrast, for bistable crystalline ferroelectrics, operated by considerably higher voltages, the optical anisotropy is very small and light control effects can be made operative only over a range of viewing angle which is too small to be useful in display applications.

The present invention operates by field effect, meaning that very high impedance and correspondingly low currents are found. This is compatible with the low power dissipation required in many applications. Thus, as a result of the microsecond switching speed, sufficient intrinsic non-linearity and lower power consumption, the present invention is suitable for large scale matrix addressing and multiplexing applications. Among other things, it thus opens up the video domain and the optics communications domain for liquid crystals.

BRIEF DESCRIPTION OF THE DRAWING

These and other objects and advantages of the invention will become more apparent or more readily appreciated from the following detailed description of the presently preferred exemplary embodiments of the invention taken in conjunction with the accompanying drawing, of which.

DESCRIPTION OF THE PREFERRED EMBODIMENTS

Figure 2:
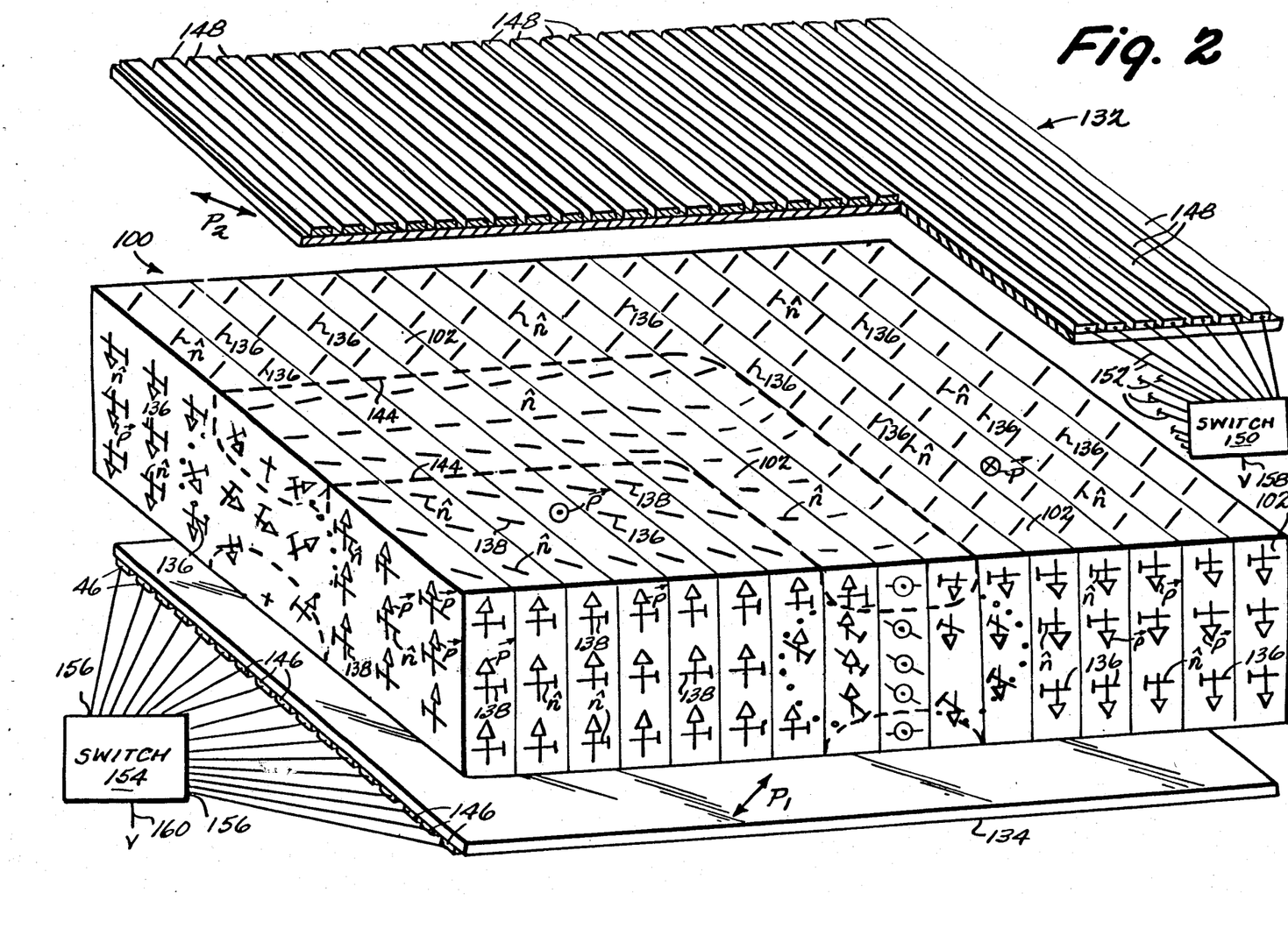
FIG. 2 is a schematic, exploded, representation of an electro-optical device according to the present invention.

FIG. 2 illustrates an electro-optical device according to the present invention. Liquid crystal 100 is positioned between uniformly spaced flat or nearly flat plates 132 and 134. The planes of layers 102 are formed perpendicular to plates 132 and 134. Within each layer, the vector $\hat{n}$ indicating the orientation of the axes lies at an angle $\Psi_O$ with respect to the normal of layers 102.

The surfaces of plates 132 and 134, which are contiguous with liquid crystal 100, are treated to favor a liquid crystal molecular orientation at the surface which has the average orientation of the molecular long axes parallel to the surface, but of unspecified direction in the surface plane. Several methods for achieving this orientation are known, and the specific surface treatment employed depends on the smectic C or H compound or compounds being used. For example, with the compounds decyloxybenzylidene p'-amino 2 methyl butyl cinnamate (DOBAMBC) and hexyloxybenzylidene p'-amino 2 chloropropyl cinnamate (HOBACPC) either clean glass or clean tin oxide layers 135 induce this orientation. Alternately, reference numeral 135 may be a coating of an appropriate polymer, such as n-methyl-3-aminopropyltrimeth-oxysilane (MAP) has also been shown to induce this orientation. See Kahn et al, *Proceedings of the IEEE*, Volume 61 (1973, pp. 281–8).

As mentioned above, layers 102 must be normal or nearly normal to plates 132 and 134. This can be readily achieved in materials which possess smectic A phases at higher temperatures. In this case, the smectic A liquid crystal is formed by cooling from either the isotropic or nematic phases, depending on the compound. The formation of a smectic A phase with the abovementioned boundary conditions will produce a fan texture which has layers normal to the bounding plates and locally bent into arcs of circles. Upon cooling to the smectic C or H phase, this arrangement of layers is left essentially unchanged, primarily because of the elastic restoring forces present against compression of the layers.

For many applications, such as light valves, it is further necessary to orient layers 102 so that they are flat and uniformly normal to some direction parallel to the plates 132 and 134. This can be achieved in several ways. If the smectic A is formed from a nematic phase, the application of a sufficiently large magnetic field oriented parallel to plates 132 and 134 will produce a nematic monodomain with the average molecular orientation along the magnetic field. Upon cooling into the smectic A phase, a smectic A monodomain will form, having flat layers normal to the magnetic field direction.

A smectic A monodomain can also be formed by applying a shear strain to the liquid crystal in the smectic A phase near the high end of the smectic A temperature range. In this case, one boundary plate is moved very gently (so as not to induce homeotropic alignment) relative to the other. The layers, in order to minimize elastic strain, will reorient to lie parallel to the direction of plate motion. This method is especially useful for materials and mixtures which exhibit no nematic phase.

Once the smectic A sample is oriented with layers 102 flat and normal to plates 132 and 134, cooling to the smectic C or H phase leads to the structure indicated in FIG. 2. As indicated in FIG. 1, for thick samples the unit vectors (n̂) 106-130 and therefore dipoles $\vec{P}$ spiral about the direction normal to the layers, a result of the molecular optical activity. However, this helix cannot form throughout the liquid crystal and still satisfy the boundary condition of having molecules parallel to plates 132 and 134 at the surface of the liquid crystal. As the liquid crystal is made thinner, such that the distance between plates 132 and 134 approaches the helix pitch, the volume decreases and it costs less energy to unwind the helix in the bulk so that for sufficiently thin samples, the boundary condition will be satisfied and the helix suppressed. The suppression of the helix is found when the plates are separated by a distance of less than on the order of five times the helix pitch.

This helix suppression leads to molecular orientation 136, or the equally stable molecular orientation 138 as illustrated in FIG. 2. As illustrated, orientation 138 has electric dipole $\vec{P}$ up and orientation 136 has electric dipole $\vec{P}$ down. Either orientation can be favored by the application of an electric field to the sample to produce a field parallel to the polarization dipole $\vec{P}$. The orientations in the sample will be separated by domain walls illustrated by dashed lines 144, the structure and width of which will be determined by the energy required to alter the smectic tilt angle, the layer compression energy, and, most importantly, the surface energy and director bend and twist elastic energies. In 1.5 $\mu$m thick DOBAMBC and HOBACPC samples, the domain walls are less than 1 $\mu$m thick. The application of an electric field will alter the orientation of molecules in the domain wall region to expand the favored orientation.

Domain walls interact with defects in the layer structure, scratches and pits in the surface, and particulate impurities in the bulk and on the surface. These interactions have the effect of maintaining the positions of the domain walls once moved to a particular place by an applied electric field. As a result, the domains exhibit hysteresis, which gives threshold behavior and bistability. Bistability results since upon completion of a short application of an electric field applied to favor, for example, orientation 138, the domain wall will be stably pinned so that the sample will remain in orientation 138. Similarly, the same holds for the opposite polarity field with orientation 136. Threshold behavior results because once the walls become bound, it takes an applied force larger than some critical value to dislodge them.

The sudden application of an electric field aimed at causing switching will be followed by the nucleation and motion of domain walls. The time required for a given area of the sample to change state will be determined by the rate of domain wall displacement and the distance they must travel to sweep over the entire sample. In general for bistable latching by an electric field pulse to occur, the electric field pulse must be of sufficient duration so that change of orientation is completed during the pulse. This time will decrease with increasing applied electric field because of more rapid domain wall motion and more numerous domain walls.

In a 1.5 $\mu$m thick HOBACPC sample at T=88° C. made with clean tin oxide coated plates, a rectangular voltage pulse of duration $\tau$=5 $\mu$s and amplitude A=10 V will switch the liquid crystal orientation field in about 5 $\mu$s. As $\tau$ or A is reduced the switching threshold is approached such that a 10 V, 4 $\mu$s or 8 V, 5 $\mu$s pulse will not actuate switching. The sample will remain in the switched state until an above threshold pulse of the opposite polarity is applied. In the above mentioned HOBACPC samples, pulses over the range A=0.2 V, $\tau$=4 $\mu$s to A=55 V, $\tau$=500 ns were observed to actuate switching. In the case of short, high voltage pulses, the reorientation response time did not decrease below 1 $\mu$s.

The contrast ratio critically depends on the quality of the surface treatment, the polarizers employed and their orientation, and on the pulse height and width. With 5 $\mu$s, 10 V pulses, and with unsophisticated surface treatment, a contrast ratio of better than 20:1 was easily obtained in laboratory samples.

More complex surface treatments will enhance bistability. For example, a series of parallel, rectangular ridges 137 (several $\mu$m wide, several $\mu$m high, and spaced by several $\mu$m) can effectively orient the unit vector n̂ at the surface such that the molecular long axes are parallel to the ridges. In the preferred embodiment, it is advantageous to employ two sets of parallel ridges 137, oriented at an angle of 2 $\Psi_0$ with respect to each other such that in orientation 136, the unit vector is parallel to one set of ridges, and in orientation 138, the unit vector is parallel to the other set. In this way, hysteresis exhibited in moving between the two stable orientations can be precisely controlled.

As explained above with respect to FIG. 2, molecular orientation 136 is different from molecular orientation 138. This difference may be exploited as the basis of a light control mechanism as follows. Sample 30 is disposed between polarizing sheets. In the preferred embodiment, plates 132 and 134 are themselves polarizers. In the simplest light valve embodiment, plates 132 and 134 are oriented with their easy polarization axes, P1 and P2, respectively, mutually perpendicular. Liquid crystal 100, which is biaxial having the plane containing the optical axes parallel to plates 132 and 134, is oriented so that one of the optical axes is parallel to the polarization direction P1 of plate 134 in one of the stable orientations, such as orientation 136. With liquid crystal 100 in orientation 136, light passing through plate 134 and normally incident on crystal 100 will traverse the sample with its polarization state unchanged and be extinguished by plate 132 having a perpendicular polarization direction P2. Upon switching liquid crystal 100 to orientation 138, the optical axis of the liquid crystal rotates to make an angle of approximately 2 $\Psi_0$ with the polarization direction of plate 134, and due to the birefringence of liquid crystal 100, the light will, in general, become elliptically polarized as it traverses liquid crystal 100. (The placement of the polarizers have to be altered if $\Psi_0$ is about 45°. However, presently known compounds have values of $\Psi_0$ between 10° and 30° in a 15°-20° C. temperature range). if the light of wavelength $\lambda$ which is polarized along the P1 direction is incident normally on crystal 100, then the fraction F, of the light intensity which is transmitted will be given by:

$$F = F_0 [\sin(4\Psi_0) \cdot \sin(\pi \cdot \Delta n \cdot d / \lambda)]^2$$

where d is the distance between the plates, $\Delta n$ is the principal refractive index difference and $F_0$ is the fraction transmitted by the parallel polarizers alone. For typical smectic C or H compounds we have $\Psi_0 \simeq 23°$ in which case optimum transmission ($F = F_0$) can be achieved for $d \simeq \lambda/2 \Delta n$, i.e., for $d \simeq 1.2$ $\mu m$ since $\Delta n \simeq 0.2$. Hence only very thin samples are required for significant electro-optical effects. This is a useful property since, as a result, the range of angles of incidence over which electro-optical effect is operative is large.

The polarizer-liquid crystal-polarizer geometry may also be exploited for more general orientations of the polarizer and liquid crystal. Light exiting the first polarizer will be polarized along the direction of its easy axis. In passing through the liquid crystal this light will become elliptically polarized. The second polarizer will then select the component of the elliptically polarized light parallel to its easy axis.

As is well known, with white light incident on such an arrangement, the exiting light will exhibit birefringence colors, which may be selected by appropriate relative orientation of the sample and polarizers.

Any means may be employed to generate the electric field. All that is necessary is a pair of electrodes on opposite sides of the liquid crystal. If a tin oxide coating is employed on plates 132 and 134, conductors may be attached to the coating and a voltage applied across plates 132 and 134 to create an electric field.

FIG. 2 illustrates an embodiment which may be employed as a matrix addressed video display. Electrodes 148 are attached to plate 132 in a uniformly spaced and parallel manner. Electrodes 146 are applied in the same manner to plate 134 except in a direction perpendicular to electrodes 148. Each of terminals 152 of switch 150 is electrically connected to one of electrodes 148. Similarly, each of terminals 156 of switch means 154 is electrically connected to one of electrodes 146. Terminal 158 of switch 150 and terminal 160 of switch 154 are connected to opposite terminals of a voltage source. Switches 150 and 154 include means for applying the voltage from the voltage source across any of electrodes 148 and any of electrodes 146.

Thus, each of the rectangular volumes of liquid crystal 100 which lies perpendicularly between any one of electrodes 146 and any one of electrodes 148 defines a region in liquid crystal 100. Switch means 150 and 154 can be controlled to apply a voltage across the electrodes contiguous with any particular rectangular volume. This produces an electrical field within the rectangular volume perpendicular to plates 132 and 134 and parallel to layers 102 in which field dipoles $\vec{P}$ tend to align.

Switches 150 and 154 also provide means for reversing the polarity of the voltage across electrodes 146 and 148 so that the direction of the field within any particular rectangular volume can be reversed. By reversing the direction of the electric field, the orientation of the molecules in any particular rectangular volume region of liquid crystal 100 can be changed. In this application the observed threshold behavior is essential if voltages applied to selected electrode 146 and 148 are to switch only that volume defined by their intersection.

Although only a few exemplary embodiments of this invention have been described in detail above, those skilled in the art will readily appreciate that many modifications are possible in the exemplary embodiments without materially departing from the novel teachings and advantages of this invention. For example, a back reflector may be disposed behind plate 134 to form a device operative in a reflective mode. Light passes through plate 132, sample 100, and plate 134 and reflects off of the reflector back through these layers.

Accordingly, all such modifications are intended to be included within the scope of this invention as defined in the following claims.

What is claimed is:

1. A liquid crystal electro-optical device comprising:
   a quantity of chiral, at least one of smectic C and smectic H, liquid crystal having a plurality of adjacently disposed layers each comprised of a plurality of molecules, each molecule having a long axis;
   first and second means, perpendicular to and contiguous with said layers, for aligning the long axes of said molecules adjacent to said first and second means parallel to said first and second means, said molecules of said layers in a bulk of said liquid crystal forming helixes having axes perpendicular to said layers, the distance between said first and second means being less than the distance at which said helixes form in the absence of an electric field, said first and second means causing said long axes to assume one of a first and second stable orientation;
   means for applying an electric field to at least a portion of said layers, said electric field being parallel to said layers and perpendicular to said first and second means, and for reversing the direction of said electric field, the strength of said electric field being sufficient to shift the long axis of molecules in said portion of said layers from said first orientation to said second orientation upon application of said electric field in a direction reversed from the direction of said electric field previously applied; and
   means for processing light passing through said liquid crytstal so that light passing through portions of said liquid crystal having said first orientation can be distinguished from light passing through portions of said liquid crystal having said second orientation.

2. A liquid crystal electro-optical device comprising:
   a quantity of chiral, at least one of smectic C and smectic H, liquid crystal, said liquid crystal having a plurality of adjacently disposed layers each comprised of a plurality of molecules, each molecule having a long axis;

first and second means, perpendicular to and contiguous with said layers, for aligning said long axis of molecules adjacent to said first and second means parallel to said first and second means, said molecules of said layers in a bulk of said liquid crystal forming helixes having axes perpendicular to said layers, the distance between said first and second means being less than the distance at which said helixes form in the absence of an electric field, said first and second means causing said long axes to assume one of a first and second stable orientation;

means for selectively applying an electric field to any of a plurality of portions of said layers, said electric field being parallel to said layers and perpendicular to said first and second means, and for reversing the direction of said electric field, the strength of said electric field being sufficient to shift molecules in said any of a plurality of portions from said first orientation to said second orientation upon application of said electric field in a direction reversed from the direction of said electric field previously applied; and means for processing light passing through said liquid crystal so that light passing through portions of said liquid crystal having said first orientation can be distinguished from light passing through portions of said liquid crystal having said second orientation.

3. A device as in claim 1 or 2 wherein said liquid crystal is any one of the group consisting of decycloxytbenzylidene p'-amino 2 methyl butyl cinnamate and hexyloxy-benzylidene p-amino 2 chloropropyl cinnamate.

4. A device as in claim 3 wherein said first and second means comprises plates having at least one of a glass and a tin oxide surface contiguous with said liquid crystal.

5. A device as in claim 1 or 2 wherein said applying means comprises first and second electrodes disposed adjacent to said first and second means, respectively, and means for applying a voltage across said first and second electrodes.

6. A device as in claim 1 or 2 wherein:

said liquid crystal has at least a first optical axis in a first direction during said first orientation and in a second direction during said second orientation; and said first and second means, said applying means and said processing means comprise first and second plates having surface means contiguous with said liquid crystal for aligning said long axis of molecules adjacent to said surface means parallel to said surface means, said first plate including means for polarizing light in said first direction and said second plate including means for polarizing light in a direction perpendicular to said first direction, first and second electrodes disposed adjacent to said first and second plates, respectively, and means for applying a voltage across said first and second electrodes.

7. A device as in claim 1 or 2 wherein said helixes have a pitch and the distance between said first and second means is no more than five times said pitch.

8. A liquid crystal electro-optical device comprising:

a quantity of chiral, at least one of smectic C and smectic H, liquid crystal having a plurality of adjacently disposed layers, each comprised of a plurality of molecules, each molecule having a long axis;

first and second plates perpendicular to said layers, said first and second plates including means, contiguous with said liquid crystal for aligning the long axis of said molecules adjacent to said aligning means parallel to said plates, said molecules of said layers in a bulk of said liquid crystal forming helixes having axes perpendicular to said layers, the distance between said first plate and said second plate being less than the distance at which said helixes form in the absence of an electric field;

a first electrode disposed on one side of said liquid crystal parallel to said first and second plates;

a second electrode disposed on the other side of said liquid crystal parallel to said first and second plates and opposite said first electrode;

means for applying a voltage across said first and second electrodes for creating an electric field parallel to said layers and perpendicular to said plates, and for reversing the polarity of said voltage, said voltage being such that the strength of said electric field is sufficient to shift the long axis of molecules in a portion of said layers between said electrodes from a first orientation to a second orientation upon application of said electric field in a direction reversed from the direction of said electric field previously applied; and means for processing light passing through said liquid crystal so that light passing through portions of said liquid crystal having said first orientation can be distinguished from light passing through portions of said liquid crystal having said second orientation.

9. A liquid crystal electro-optical device comprising:

a quantity of chiral, at least one of smectic C and smectic H, liquid crystal having a plurality of adjacently disposed layers, each comprised of a plurality of molecules, each molecule having a long axis;

first and second plates perpendicular to said layers, said first and second plates including means, contiguous with said liquid crystal, for aligning the long axis of said molecules adjacent to said aligning means parallel to said plates, said molecules of said layers in a bulk of said liquid crystal forming helixes having axes perpendicular to said layers, the distance between said first plate and said second plate being less than the distance at which said helixes form in the absence of an electric field;

a plurality of first electrodes disposed on one side of said liquid crystal parallel to said first and second plates;

a plurality of second electrodes disposed on the other side of said liquid crystal parallel to said first and second plates and transverse to said first electrodes;

means for selectively applying a voltage across any of said first electrodes and any of said second electrodes for creating an electric field in any of a plurality of portions of said liquid crystal parallel to said layers and perpendicular to said plates, and for reversing the polarity of said voltage, said voltage being such that the strength of said electric field is sufficient to shift the long axis of molecules in said any of a plurality of portions from a first orientation to a second orientation upon application of said electric field in a direction reversed from the direction of said electric field previously applied; and means for processing light passing through said liquid crystal so that light passing through portions of said liquid crystal having said first orientation can be distinguished from light passing through portions of said liquid crystal having said second orientation.

10. A device as in claim 1, 2, 8 or 9 wherein said orientation remains after said electric field is removed.

11. A device as in claim 1, 2, 8 or 9 wherein said liquid crystal has at least a first optical axis in a first direction in said first orientation and in a second direction in said second orientation; and said means for processing includes first means for polarizing light in said first direction and second means for polarizing light perpendicular to said first direction, said first and second polarizing means being disposed on opposite sides of said liquid crystal.

12. A device as in claim 2 wherein said applying means comprises:

a plurality of first electrodes extending in a direction, a plurality of second electrodes extending perpendicular to said direction, said first electrodes being disposed on a side of said liquid crystal opposite said second electrodes;

and means for selectively applying a voltage across any of said first electrodes and any of said second electrodes to selectively apply said field to any of a plurality of portions of said liquid crystal.

13. A device as in claim 8 or 9 wherein said helixes have a pitch and the distance between said first and second plates is no more than five times said pitch.

14. A device as in claim 8 or 9 wherein said liquid crystal is any one of the group consisting of decycloxybenzylidene p'-amino 2 methyl butyl cinnamate and hexyloxybenzylidene p'-amino 2 chloropropyl cinnamate.

15. A device as in claim 14 wherein said first and second means comprises plates having at least one of a glass surface and a tin oxide surface contiguous with said liquid crystal.

16. A device as in claim 1, 2, 8 or 9 wherein said aligning means includes first ridges extending parallel to said first orientation and second ridges extending parallel to said second orientation.

17. A process of making an electro-optical device including a chiral, at least one of smectic C and smectic H, liquid crystal, molecules in a bulk of said liquid crystal forming helixes, first and second means for containing said liquid crystal, means for applying an electric field to at least a portion of said liquid crystal and means for processing light passing through said liquid crystal, said method comprising:

aligning the molecules of said liquid crystal adjacent to said first and second means parallel to said first and second means, but free to move between at least two particular orientations; and suppressing the formation of said helixes.

18. A process of making an electro-optical device including a chiral, at least one of smectic C or smectic H, liquid crystal, molecules in a bulk of said liquid crystal forming helixes, first and second means for containing said liquid crystal, means for applying an electric field to at least a portion of said liquid crystal and means for processing light passing through said liquid crystal, said method comprising:

disposing said first means a distance from said second means less than the distance at which said helixes form;

first cooling said liquid crystal from at least one of an isotropic and nematic phases;

aligning the molecules of said liquid crystal adjacent to said first and second means parallel to said first and second means, but free to move between at least two particular orientations; and orienting said liquid crystal during said first cooling step to form at least one of smectic C and smectic H phases in flat layers perpendicular to said first and second means.

19. A process of making an electro-optical device including a chiral, at least one of smectic C or smectic H, liquid crystal, molecules in a bulk of said liquid crystal forming helixes, first and second means for containing said liquid crystal, means for applying an electric field to at least a portion of said liquid crystal and means for processing light passing through said liquid crystal, said method comprising:

disposing said first means a distance from said second means less than the distance at which said helixes form;

first cooling said liquid crystal from at least one of an isotropic and nematic phases to a smectic A phase;

aligning the molecules of said liquid crystal adjacent to said first and second means parallel to said first and second means, but free to move between at least two particular orientations;

orienting said liquid crystal during said first cooling step to form said smectic A liquid crystal in flat layers perpendicular to said first and second means; and second cooling of said liquid crystal from said smectic A phase to said at least one of smectic C and smectic H phases.

20. A process as in claim 19 or 18 wherein said first cooling step is from a nematic phase and said orienting step comprises the step of applying a field parallel to said first and second means.

21. A process as in claim 19 or 18 wherein said orienting step comprises the step of gently moving said first means parallel to and with respect to said second means.

22. A device as in claim 1 or 2 wherein:

said liquid crystal has at least a first optical axis in a first direction during said first orientation and in a second direction during said second orientation; and said first and second means, said applying means and said processing means comprise first and second plates having surface means contiguous with said liquid crystal for aligning said long axis of molecules adjacent to said surface means parallel to said surface means, said first plate including means for polarizing light in a third direction and said second plate including means for polarizing light in a fourth direction, said third and fourth directions causing said polarizing means to induce birefringence colors in transmitted light upon change in said optic axis reorientation, first and second electrodes disposed adjacent to said first and second plates, respectively, and means for applying a voltage across said first and second electrodes.

23. A device as in claim 1, 2, 8 or 9 wherein said liquid crystal has at least a first optical axis in a first direction in said first orientation and in a second direction in said second orientation; and said means for processing includes first means for polarizing light in a third direction and second means for polarizing light in a fourth direction, said third and fourth directions causing said polarizing means to induce birefringence colors in transmitted light upon change in said optic axis reorientation, said first and second polarizing means being disposed on opposite sides of said liquid crystal.

24. A process as in claim 19 wherein:
said first cooling step is from a nematic phase; and
said orienting step comprises the step of gently moving said first means parallel to and with respect to said second means while applying a magnetic field parallel to said first and second means.

* * * * *